United States Patent [19]
Burke et al.

[11] Patent Number: 5,460,238
[45] Date of Patent: Oct. 24, 1995

[54] GEARBOX MOUNTING

[75] Inventors: Sean A. Burke, Reddich; Garry J. Preece, Claverdon, both of United Kingdom

[73] Assignee: Jaguar Cars Limited, United Kingdom

[21] Appl. No.: 213,620

[22] Filed: Mar. 15, 1994

[30] Foreign Application Priority Data

Mar. 17, 1993 [GB] United Kingdom ............... 9305474

[51] Int. Cl.⁶ ............................................. B60K 5/12
[52] U.S. Cl. ................... 180/299; 180/312; 248/638; 267/293; 267/141.3
[58] Field of Search ............................ 180/312, 293, 180/299; 248/632, 634, 638; 267/140, 141.3, 293

[56] References Cited

U.S. PATENT DOCUMENTS

| 4,270,625 | 6/1981 | Nishimura et al. | 248/638 X |
|---|---|---|---|
| 5,174,541 | 12/1992 | Hutter et al. | 248/636 |
| 5,263,815 | 11/1993 | Brenner | 180/312 X |

FOREIGN PATENT DOCUMENTS

| 0075807 | 4/1983 | European Pat. Off. . | |
| 0146799 | 7/1985 | European Pat. Off. | 180/312 |
| 0331569 | 9/1989 | European Pat. Off. . | |
| 2155594 | 5/1973 | France . | |
| 0200835 | 11/1984 | Japan | 248/638 |
| 2235664 | 3/1991 | United Kingdom . | |

Primary Examiner—Margaret A. Focarino
Assistant Examiner—Victor E. Johnson
Attorney, Agent, or Firm—Davis, Bujold & Streck

[57] ABSTRACT

A gear box mounting for a motor vehicle has a first member adapted to be mounted with respect to the vehicle gear box and a second member adapted to be connected to a sub-frame. The first and second members are interconnected by resilient elements inclined towards one another in a plane transverse to the longitudinal axis of the vehicle in order to provide vertical and lateral compliance of the gear box relative to the sub-frame. Buffering elements are provided between the first member and the second member and between the first member and the sub-frame to provide progressive buffering in the vertical upward and downward directions.

9 Claims, 4 Drawing Sheets

5,460,238

GEARBOX MOUNTING

BACKGROUND TO THE INVENTION

The present invention relates to a gearbox mounting for a motor vehicle.

SUMMARY OF THE INVENTION

According to one aspect of the present invention a gearbox mounting for a motor vehicle comprises; a first member adapted to be mounted with respect to a gearbox of a motor vehicle and a second member adapted to be connected to a sub-frame of the vehicle, the first and second members being interconnected by resilient elements inclined towards one another in a plane transverse to the longitudinal axis of the vehicle in order to provide vertical and lateral compliance of the gearbox relative to the sub-frame and buffering means being provided between the first member and the second member and between the first member and the sub-frame to provide buffering in both the upward and downward directions.

Preferably the resilient means are of relatively low spring rate giving low spring rates in the vertical, fore/aft and lateral directions, thereby giving good vibration and noise isolation. The buffering means between the first and second members and between the first member and the sub-frame act to give good control by means of continuous and progressive buffering in the vertical upward and downward directions.

According to a preferred embodiment of the invention, further buffering means are provided between the first member and the sub-frame to provide continuous and progressive buffering in the fore/aft direction and/or the direction transverse to the longitudinal axis of the vehicle.

The resilient elements and the buffering means are preferably elastomeric elements which are bonded to the preferably elastomeric elements which are bonded to the first and second members. The first and second members are preferably made from lightweight material, for example aluminium.

BRIEF DESCRIPTION OF THE DRAWINGS

An embodiment of the invention is now described, by way of example only, with reference to the accompanying drawings, in which.

DESCRIPTION OF A PREFERRED EMBODIMENT

As illustrated in the accompanying drawings, a gearbox mount 10 comprises a first member 11 cast from aluminium and a second member 12 pressed from aluminium.

Figure 5:
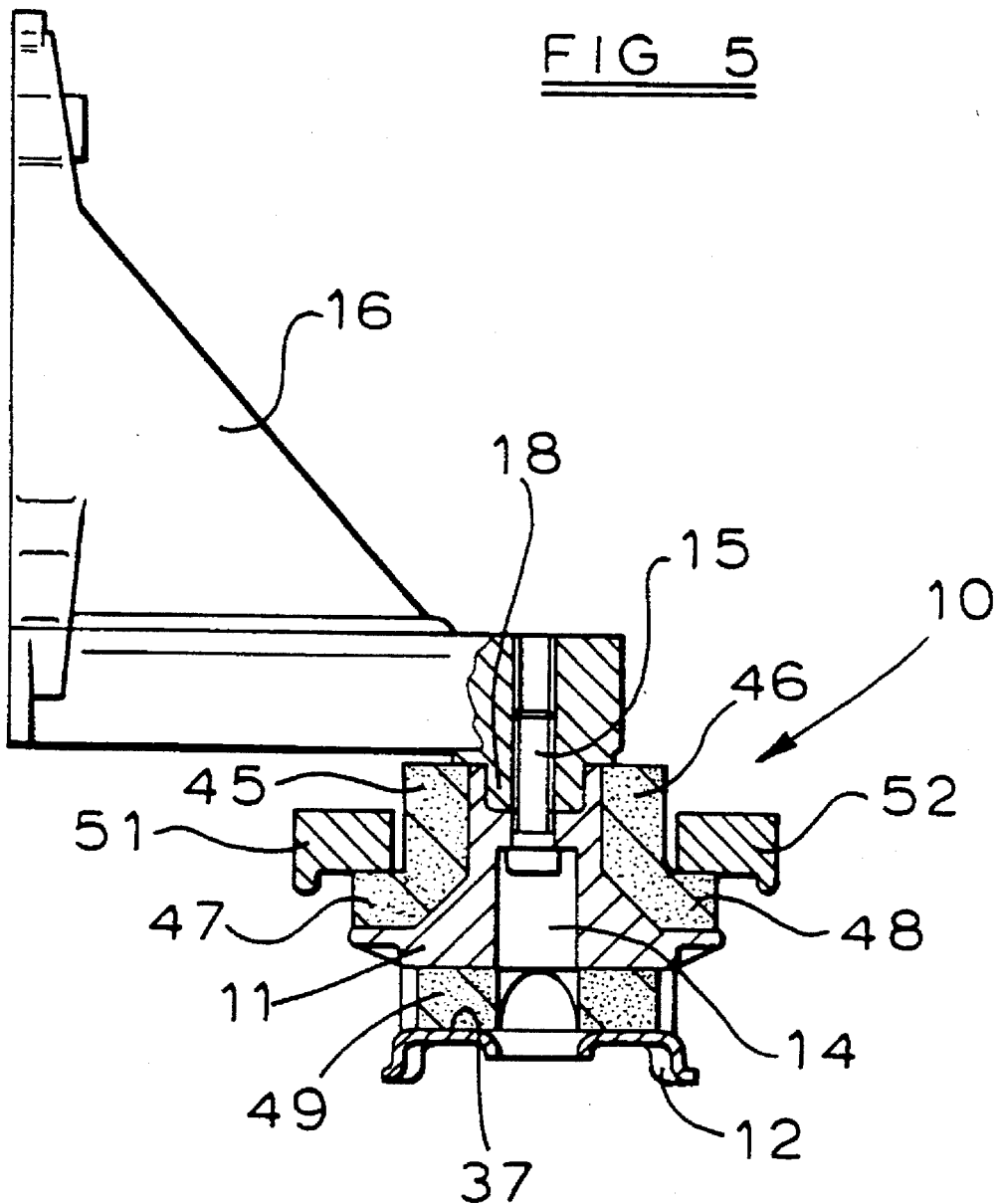
FIG. 5 is a side elevation of the mounting illustrated in FIG. 1, mounted between a gearbox and a sub-frame of a vehicle.

The first member 11 has a central body portion 13 which defines a counterbored aperture 14, through which a bolt 15 may be located to secure the mount 10 to a gearbox 16, as illustrated in FIG. 5. The aperture 14 has an enlarged diameter end portion 17 in which locates a correspondingly dimensioned boss 18 on the gearbox 16.

The sides of body portion 13 of the first member 11 define a pair of intermediate side faces 20, 21 which are inclined at equal but opposite angles to one another, converging downwardly away from the face of the body portion 13 which is bolted to the gearbox 16. The body portion 13 also defines upper side faces 20a, 21a, front and rear faces 22, 23 which extend vertically.

The lower portion 24 of the first member 11 is extended to the front and rear, to provide horizontally extending upper surfaces 25, 26 and a horizontal lower surface 27.

Figure 1:
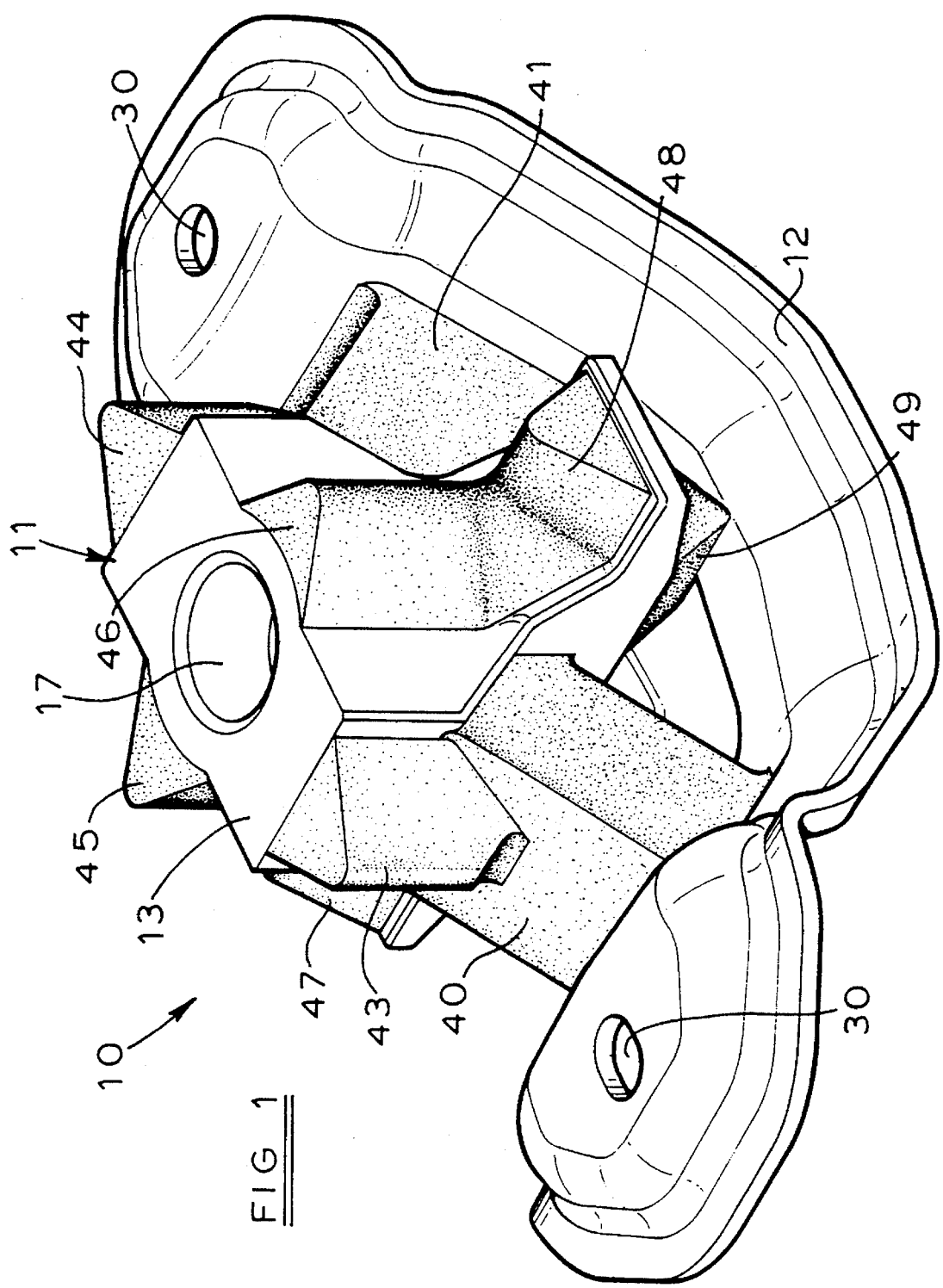
FIG. 1 is an isometric view of a gearbox mounting in accordance with the present invention.
Figure 2:
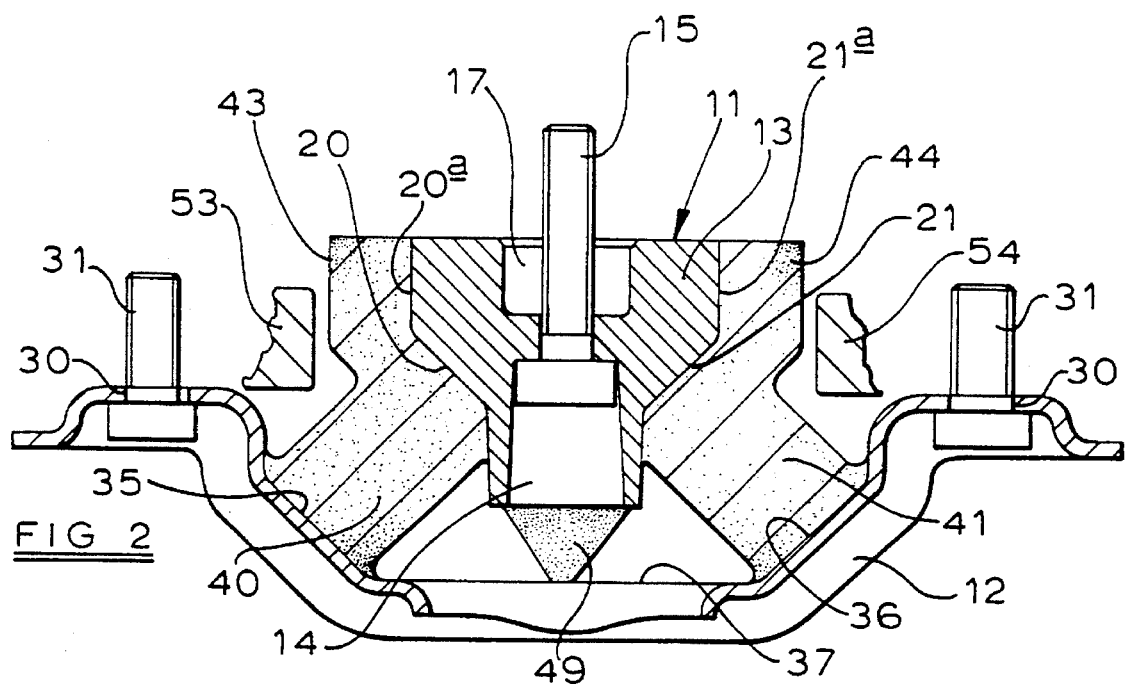
FIG. 2 is a sectional front elevation of the mounting illustrated in FIG. 1.
Figure 3:
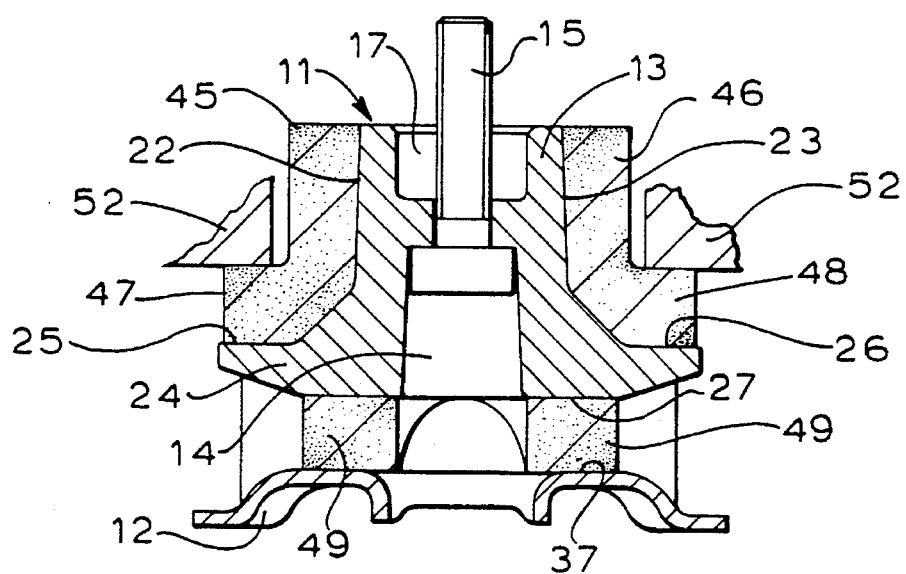
FIG. 3 is a sectional end elevation of the mounting illustrated in FIG. 1.
Figure 4:
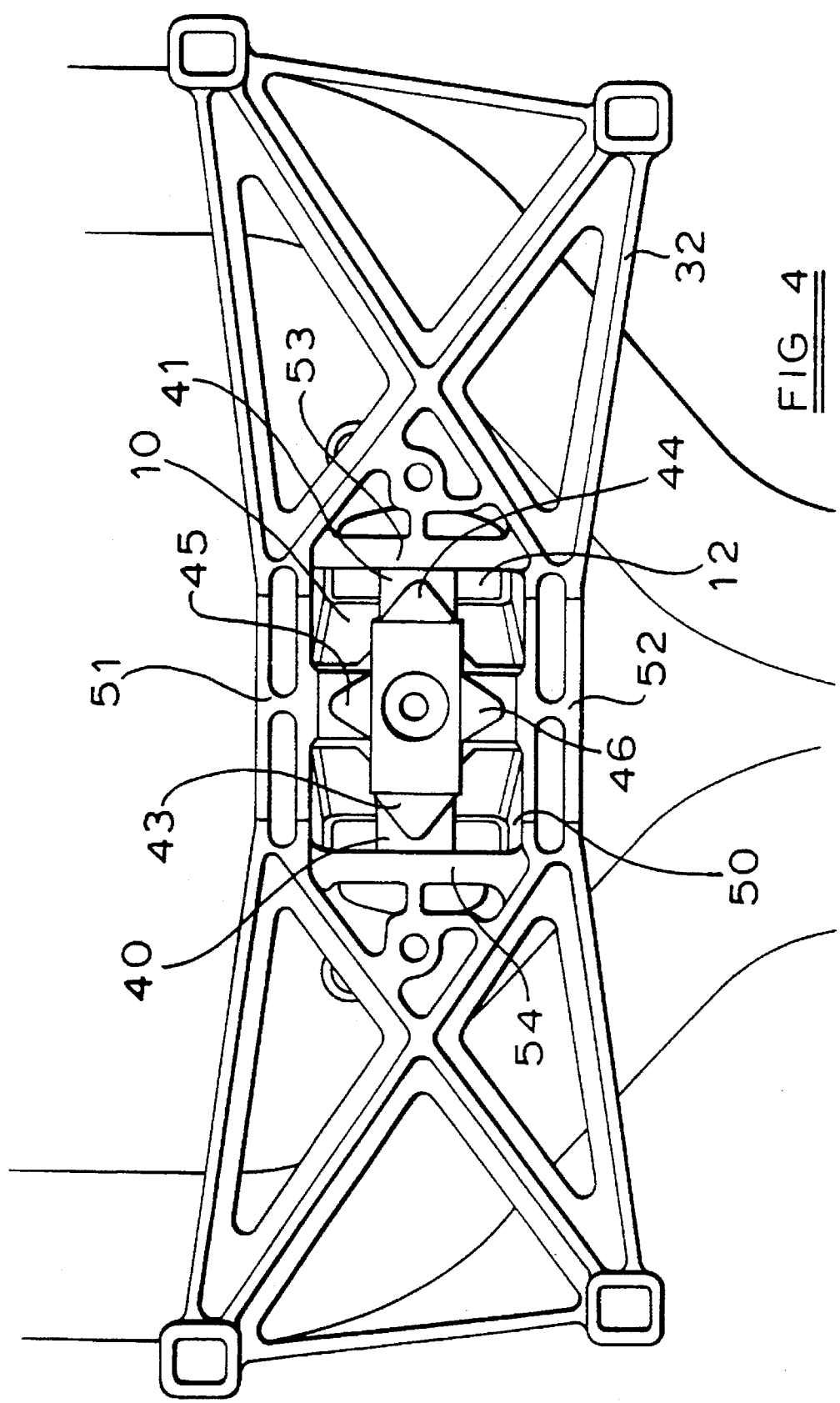
FIG. 4 is a plan view of the mounting illustrated in FIG. 1, mounted on a sub-frame of a vehicle.

The second member 12 has a pair of apertures 30 for bolts 31 by means of which it may be secured to a sub-frame 32 of the vehicle. As illustrated in FIG. 4, the second member 12 is mounted with respect to the sub-frame 32, so that it is transverse to the longitudinal axis of the vehicle. The second member 12 defines a pair of faces 35, 36 which are parallel to and aligned normally of the faces 20, 21 of the first member 11 respectively. The faces 35, 36 of the second member 12 are interconnected by a central portion 37.

Resilient elastomeric blocks 40, 41 are bonded between faces 20, 35 and 21, 36 respectively, to provide compliant mounting of the first member 11 relative to the second member 12. Elastomeric elements 43, 44, 45, 46, 47, 48 and 49 of generally triangular prismatic shape, are bonded to the faces 20a, 21a, 22, 23, 25, 26 and 27 respectively, the elastomeric element 49 extending into close proximity with a central portion 37 of the second member 12.

As illustrated in FIGS. 4 and 5, the sub-frame 32 is in the form of lattice which is secured to the vehicle. Sub-frame 32 defines a central aperture 50, the second member being secured to the underside of the sub-frame 32 so that the central portion 13 of the first member 11 will extend through the aperture 50 to enable it to be secured to the gearbox 16 as described above.

The aperture 50 is defined by front cross-member 51, side members 53, 54 and rear cross-member 52. When the mount 10 is located in position with respect to the sub-frame 32, the elastomeric elements 43 and 44 extend into close proximity to the inner edges of side members 53 and 54 respectively; elastomeric elements 45 and 46 extend into close proximity to the inner edges of cross-members 51 and 52; and elastomeric elements 47 and 48 engage the undersides of cross-members 51, 52.

Vertical longitudinal and lateral compliance of the mount 10 is provided by the elastomeric blocks 40, 41, permitting the gearbox 16 to move vertically, transversely or longitudinally relative to the vehicle, thereby isolating vibrations and noise therefrom. Typically, the surfaces 20, 35 and 21, 36 will be inclined at 90° towards one another each at 45° to the horizontal, so that the effective spring rates of the elastomeric blocks 40, 41 in the vertical and lateral directions, will be equal. The angle of inclination of the faces 20, 35 and 21, 36 may however be varied to vary the ratio of the spring rates in the vertical and lateral directions.

The elastomeric elements 47, 48 and 49 will provide progressive buffering between the first member 11 and the sub-frame 32 and between the first member 11 and the second member 12, upon upward or downward movement of the gearbox 16, respectively. Elastomeric elements 45 and 46 will provide progressive buffering between the first member 11 and sub-frame 32 for any longitudinal movement of the gearbox in the forward or rearward direction, for example as a result of the loads imposed on the engine and gearbox 16 during braking or slow speed collisions. The elastomeric elements 43 and 44 provide progressive buffering between the first member 11 and sub-frame 32 for any lateral movement, in order to eliminate axle tramp.

The elastomeric blocks 40, 41 and elastomeric elements 43, 44, 45, 46, 47, 48 and 49 may be bonded to the respective surfaces of the first and second members 11 and 12, by moulding in contact with said surfaces the elements 43, 44 typically forming an extension of blocks 40, 41. This may be done in a single moulding operation, the first and second members being located in the mould and elastomeric composition being injected into the mould at the appropriate locations. The elastomeric blocks 40, 41 and elastomeric elements 45, 46, 47, 48 and 49 may be made of any suitable natural or synthetic rubber composition, the characteristics of which may be selected to give appropriate spring rates and buffering in the vertical transverse and fore/aft directions.

Various modifications may be made without departing from the invention. For example, while the buffering elements disclosed in the above embodiment are of triangular prismatic configuration, prismatic elements and elastomeric blocks of any suitable configuration may be used. Furthermore, while the first and second members are preferably made of lightweight materials, for example aluminium, any suitable material may be used.

We claim:

1. A motor vehicle having a gearbox mounted resiliently with respect to the vehicle by means of a gearbox mounting, the gear box mounting comprising a first member secured to the gearbox, said first member having a vertical axis, and a second member mounted to a sub-frame of the vehicle, the second member having a central axis extending normally thereof which is coincident with the vertical axis of the first member, the first and second members being interconnected by a pair of resilient blocks, the resilient blocks being located one on either side of the vertical axis of the members and being inclined towards one another in a plane transverse to a longitudinal axis of the vehicle in order to provide vertical and lateral compliance of the gearbox relative to the sub-frame, the second member being secured to the sub-frame on a side thereof remote from the gearbox, the first member extending through an aperture in the sub-frame and being connected to the gearbox, buffering means on the first member, extending in close proximity with surfaces of the sub-frame defining the aperture, to provide buffering of gearbox movement in one of a longitudinal direction of the vehicle and a direction transverse to the longitudinal direction of the vehicle; buffering means also being provided on the first member to engage said remote side of the sub-frame to provide buffering of gearbox movement in the vertical direction away from the sub-frame; and buffering means also being provided on a lower portion of the first member to provide buffering of gearbox movement in the vertical direction towards the sub-frame.

2. A vehicle according to claim 1 in which further buffering means are provided between opposed surfaces of the first member and the sub-frame to provide buffering of gearbox movement in both the longitudinal direction of the vehicle and in the direction transverse to the longitudinal direction of the vehicle.

3. A vehicle according to claim 1 in which the first member has a pair of side faces inclined to a vertical, longitudinal plane of the vehicle at equal but opposite angles, the second member has a pair of inclined faces, each inclined face on the second member being opposed in parallel relationship to and disposed normally of one of the inclined faces of the first member and elastomeric blocks being bonded between the inclined faces of the first member and the opposed inclined faces of the second member.

4. A vehicle according to claim 1 in which the buffering means are elastomeric elements which are bonded to the first member.

5. A vehicle according to claim 4 in which the elastomeric elements are of triangular prismatic configuration.

6. A vehicle according to claim 4 in which the first member has vertically extending front and rear faces, the elastomeric elements being bonded to these faces to provide the buffering means between the first member and the sub-frame for buffering in the longitudinal direction of the vehicle.

7. A vehicle according to claim 4 in which the first member has vertically extending side faces, the elastomeric elements being bonded to these faces to provide the buffering means between the first member and the sub-frame for buffering in the direction transverse to the longitudinal direction of the vehicle.

8. A vehicle according to claim 4 in which the first mender has a lower portion which defines a pair of horizontal upper surfaces extending forwardly and rearwardly of the vehicle and a horizontal lower surface, the elastomeric elements being bonded to both the horizontal upper and lower surfaces to provide the buffering means between the first member and the sub-frame and between the first member and the second member to provide buffering in the vertical direction.

9. A vehicle according to claim 1 in which the first member is secured to the gearbox by fixing means located in a central aperture.

* * * * *